United States Patent
Huang et al.

(10) Patent No.: US 7,894,184 B2
(45) Date of Patent: Feb. 22, 2011

(54) PORTABLE ELECTRONIC DEVICE WITH AN ACTUATING ELEMENT TO LIFT INPUT/OUTPUT MODULES

(75) Inventors: Xiaonan Huang, Taipei (TW); Alec Wong, Taipei (TW); Chia-cheng Shih, Taipei (TW); Hung-Hsiang Chen, Taipei (TW); Daniel Alenquer, Taipei (TW); Tan-Wee Kiat, Taipei (TW); Luke Goh, Taipei (TW); Lionel Wong, Taipei (TW); Wean-Fong Loi, Taipei (TW); Hsien-Chih Wu, Taipei (TW); Chiu-Lang Huang, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/564,153

(22) Filed: Sep. 22, 2009

(65) Prior Publication Data
US 2010/0214743 A1    Aug. 26, 2010

(30) Foreign Application Priority Data

Feb. 20, 2009 (TW) ............................... 98105370 A
Jun. 26, 2009 (TW) ............................... 98121513 A

(51) Int. Cl.
*H05K 7/20* (2006.01)
(52) U.S. Cl. ........................ 361/679.48; 361/679.11; 361/679.12; 361/679.46; 361/679.47
(58) Field of Classification Search .................. None
See application file for complete search history.

(56) References Cited

U.S. PATENT DOCUMENTS

| 5,539,615 | A | * | 7/1996 | Sellers | ................. | 361/679.12 |
| 5,729,480 | A | * | 3/1998 | Katoh et al. | ................. | 708/142 |
| 5,754,395 | A | * | 5/1998 | Hsu et al. | ................. | 361/679.11 |
| 5,764,474 | A | * | 6/1998 | Youens | ................. | 361/679.12 |
| 6,008,986 | A | * | 12/1999 | Mok | ................. | 361/679.12 |
| 6,028,768 | A | * | 2/2000 | Cipolla | ................. | 361/679.12 |
| 6,091,600 | A | * | 7/2000 | Jeong | ................. | 361/679.12 |
| 6,612,668 | B2 | * | 9/2003 | Doan | ................. | 312/223.2 |
| 6,930,881 | B2 | | 8/2005 | Karidis et al. | | |

* cited by examiner

*Primary Examiner*—Boris L Chervinsky
(74) *Attorney, Agent, or Firm*—Banger Shia

(57) ABSTRACT

A portable electronic device includes a screen module, a main body module and an input/output module. The screen module is pivotally connected with the body module. The input/output module is electrically connected with the main body module. An actuating element is disposed at a bottom of the screen module. When the screen module is opened respectively to the body module to be opened, the actuating element is driven to swing to push a front end of the input/output module to be lifted to drive the input/output module to be out of a state that the keyboard abuts against the main body module. Therefore, the portable electronic device is easy to be operated. Moreover, the heat dissipation is improved to keep the internal temperature low and reduce energy consumption.

13 Claims, 12 Drawing Sheets

PORTABLE ELECTRONIC DEVICE WITH AN ACTUATING ELEMENT TO LIFT INPUT/OUTPUT MODULES

BACKGROUND

1. Field of Invention

The invention relates to a portable electronic device and more particularly, to a portable electronic device which can lift the input/output modules of the portable electronic device.

2. Description of the Related Art

Nowadays, a notebook computer is a very popular portable electronic device. Since the notebook computer is light, easy to keep, and the function is strong, the notebook computer gradually becomes a favorite of business people and even common players. The notebook computer mainly includes a screen module and a main body module pivotally connected with the screen module. When the notebook computer is kept, the screen module covers the main body module. As a result, the screen module covers a keyboard and switches on the main body module to avoid that the keyboard and the switches are touched by mistake to boot the computer. Furthermore, a frangible liquid crystal display (LCD) screen can be protected.

When a user wants to use the notebook computer, he or she rotates the screen module relative to the main body module to a certain angle and opens it to make the screen module approximately upright and convenient to be watched. At the same time, the user can use keyboard on the main body module to operate the computer or input words or symbols and so on. However, along with the trend that the notebook computer gradually becomes smaller in dimension, heat dissipation becomes more important. Since components in the notebook computer are constant, and they include a motherboard, a central processing unit (CPU), a hard disk, a memory, and processing chips and so on, in a high-frequency operation, the components certainly produce high heat. However, since the whole size of the notebook computer is decreased, the notebook computer cannot additionally accommodate additional heat dissipation elements.

Furthermore, notebook computer is usually operated on a flat surface such as a desk. Most desks are with wood or plastic tops and which are difficult to radiate heat. The whole main body module flatly contacts the desk while being operated, the heat to be taken away from the bottom of the main body module is rather limited. On the other hand, the keyboard is disposed on the main body module. Since the heat is blocked by the keyboard, the heat dissipated in this direction is also not large. At the same time, if a hot wind is forced to blow towards the keyboard while operating, the users might feel very uncomfortable.

Consequently, only side surfaces of the whole space can be provided for radiating heat. However, along with a trend that the notebook computer is gradually thin, and the thickness of the notebook computer is gradually decreased, heat dissipation performance is greatly decreased. As a result, the whole temperature becomes high, the performance of the notebook computer is reduced, and the notebook computer needs more energy to operate. At present, a high-speed fan is commonly utilized to maintain a heat dissipating capacity. However, once a fan speed is increased, the needed power also increases. At the same time, the noise generated by the rotation of the fan is multiplied.

SUMMARY OF THE INVENTION

The portable electronic device according to the invention includes a main body module, a screen module, an input/output module, and an actuating element. A bottom of the screen module is pivotally connected with the main body module. The input/output module abuts against the main body module and is electrically connected with the main body module. A back end of the input/output module is pivotally connected with the main body module. The actuating element is disposed at the bottom of the screen module. When the screen module is rotated relative to the main body module to be opened, the actuating element is driven to push a front end of the input/output module to make the input/output module rotate around the back end. Then, a gap is formed between the front end of the input/output module and the main body module, and the input/output module is detached from abutting against the main body module. On the other hand, the main body module has a disposing indentation at which the input/output module is disposed. The disposing indentation may have a plurality of cooling holes therein. The recess also has a plurality of cooling holes, and cooperating with the recess at the back of the main body module, a heat dissipation flow field can be formed, air is easy to pass through the main body module. Thus, the heat dissipation performance can be further improved. A cooling fan may be disposed at the recess, and cooperating with the back of the main body module which is an inclined surface connected with the recess, even the main body module is putted on a flat surface such as a desktop, the air can also enter the recess via the inclined surface to blow to an inner part of the main body module to maintain a better flow field.

Further, the input/output module in the present invention can also be a speaker, a keyboard module, a touch panel or a pointer input module, which is abutting against the main body module. When the screen module is rotated relative to the main body module to be opened, the actuating element is driven to push a front end of the input/output module to make the input/output module rotate around the back end. Thus the input/output module would be in a position with a suitable angle that is comfortable for users to operate the input device or to enjoy the audio/video performance of the output device.

These and other features, aspects and advantages of the present invention will become better understood with regard to the following description, appended claims, and accompanying drawings.

DETAILED DESCRIPTION OF THE INVENTION

The feature of the portable electronic device according to the invention is focused on the screen module and the input/output module. When the screen module is opened, the input/output module is lifted through the actuating element. Therefore, the input/output module is no longer abutting against the main body module. The input/output module can be a speaker, a keyboard module, a touch panel or a pointer input module, which is abutting against the main body module. The following descriptions are merely examples and should not limit the scope of the claims herein.

Figure 1:
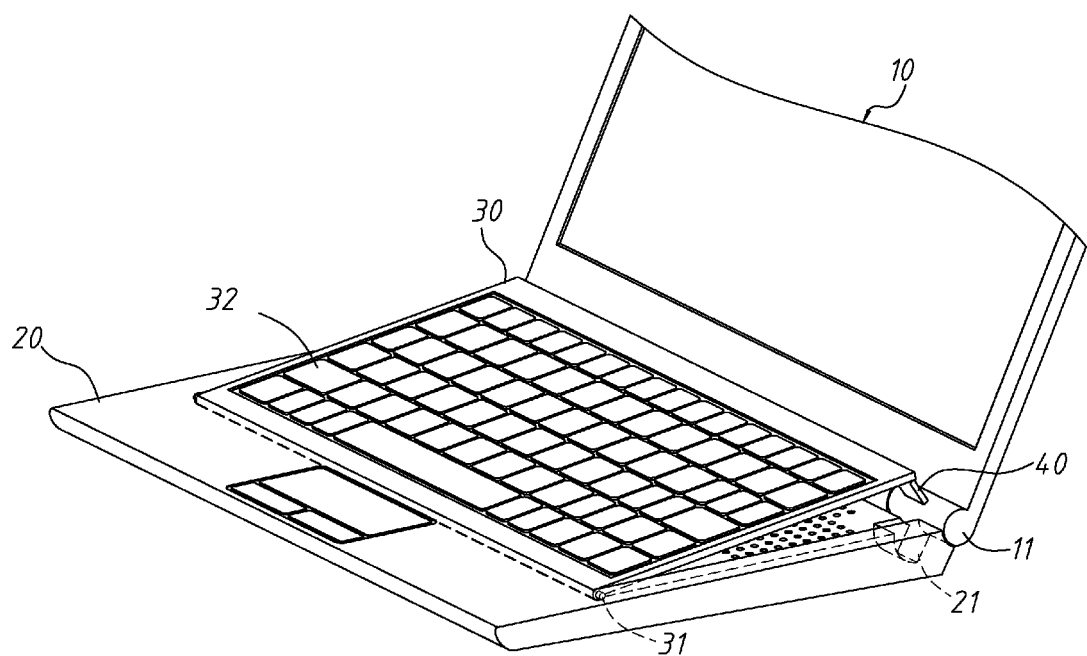
FIG. 1 is a schematic diagram showing a portable electronic device according to a first embodiment of the invention.
Figure 2:
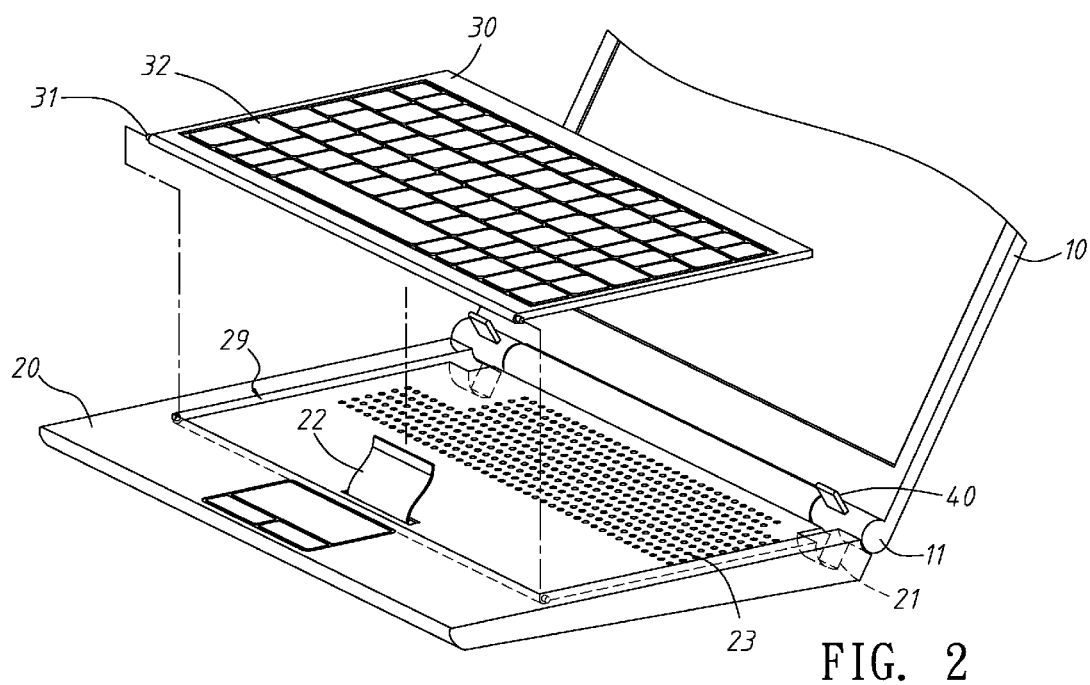
FIG. 2 is an exploded diagram showing a portable electronic device according to a first embodiment of the invention.

FIG. 1 and FIG. 2 are schematic diagrams showing a portable electronic device according to a first embodiment of the invention. In this embodiment, the lifted input/output module is the keyboard module, which occupies most area among thereof.

The portable electronic device according to the invention includes a screen module 10, a main body module 20, a keyboard module 30, and an actuating element. The main body module 20 includes electronic components such as a motherboard, a CPU, a hard disk, a memory, and processing chips therein to process electronic data. The keyboard module 30 includes a plurality of keys 32 and a pointer input portion 33. The screen module 10 has a bottom 11, and it is pivotally connected with the main body module 20 via the bottom 11 to rotate relative to the main body module 20. Then, the screen module 10 is allowed to be opened in an operation state (as shown in FIG. 1) or be superposed on the main body module 20 in a keeping state (as shown in FIG. 3A).

A back end of the keyboard module 30 is pivotally connected with the main body module 20 via a pivot 31. The main body module 20 has a disposing indentation 29 corresponding to the keyboard module 30, and the keyboard module 30 may be disposed at the disposing indentation 29. The keyboard module 30 is electrically connected with the main body module 20 via a connecting cable 22. In FIG. 2, the position of the connecting cable 22 is just taken as an example. The connecting cable 22 also may be designed to be connected with the main body module 20 via the pivot 31 at the back end of the keyboard module 30 to make the connecting cable 22 unexposed, and thus an overall appearance is not affected.

In this embodiment, the actuating element is a driving lever 40. The driving lever 40 is disposed at the bottom 11 of the screen module 10, and it can be swung along with the rotation of the screen module 10. The main body module 20 has a cooling slot 21 corresponding to the driving lever 40 to allow the driving lever 40 to swing to pass through the main body module 20.

Figure 3A:
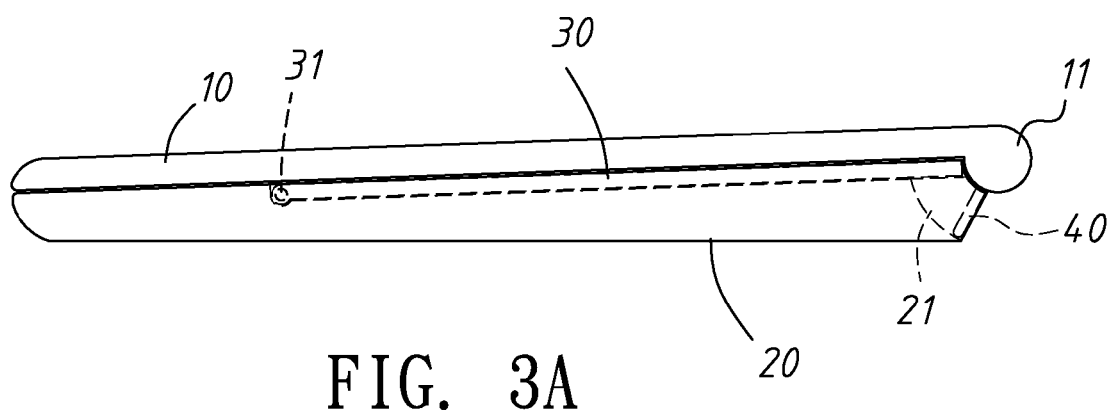
FIGS. 3A to 3C are schematic diagrams showing motions of a portable electronic device according to a second embodiment of the invention.
Figure 3B:
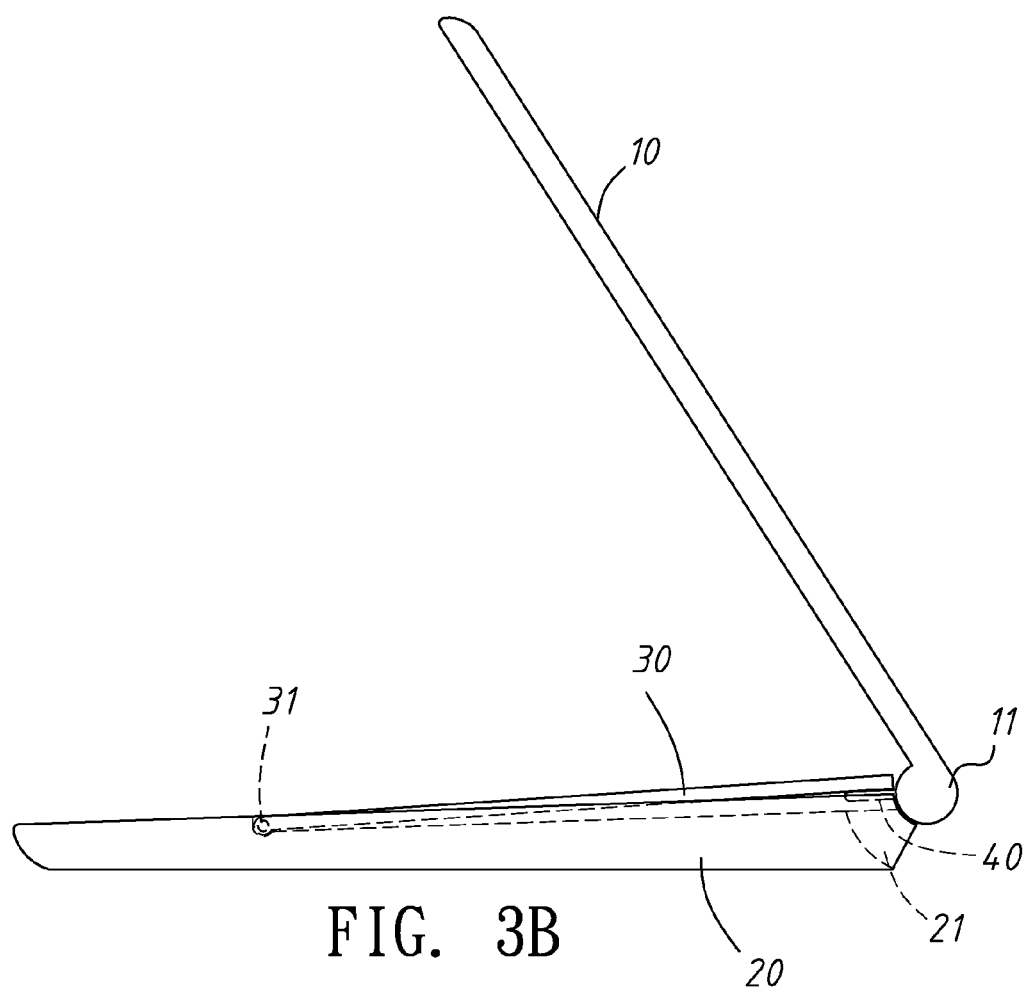
Figure 3C:
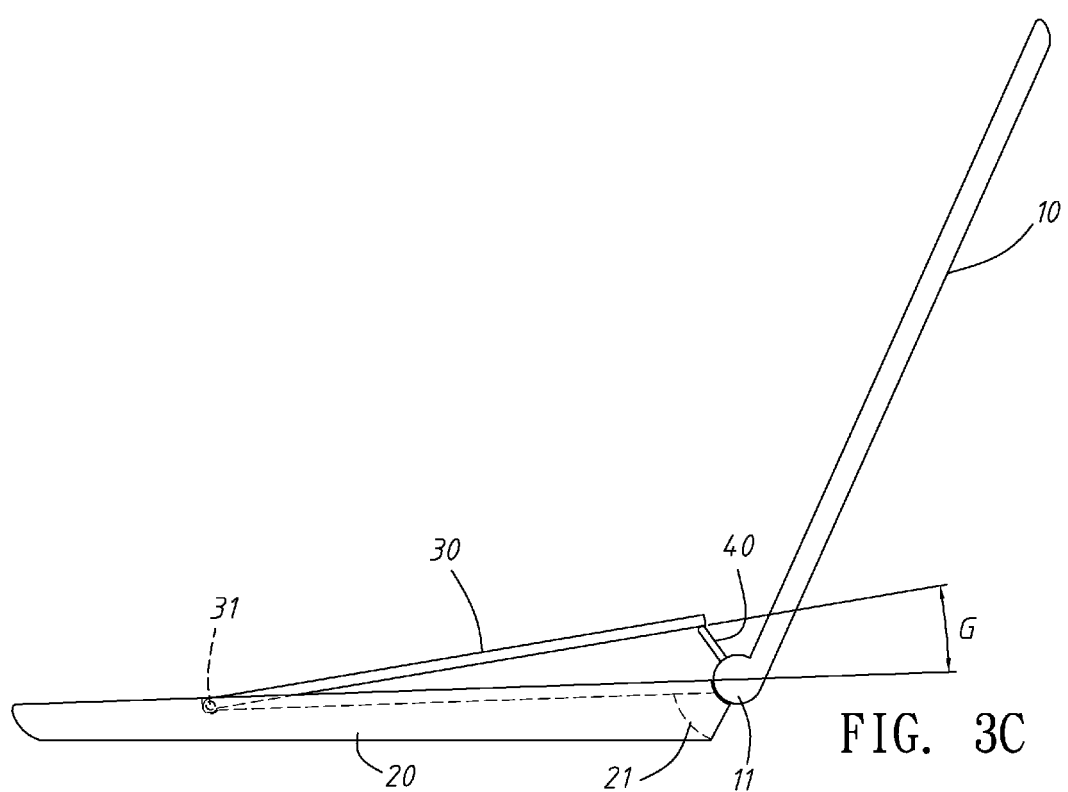

FIG. 3A~3C are schematic diagrams showing motions of a portable electronic device according to a second embodiment of the invention.

As shown in FIG. 3A, when the portable electronic device is in the keeping state, that is, the portable electronic device is not used, the screen module 10 covers and superposes on the main body module 20, and the keyboard module 30 also abuts against the main body module 20. As a result, not only the portable electronic device is easy to keep, but also the screen module 10 and the keys 32 on the keyboard module 30 can be protected. When the user wants to use the portable electronic device, as shown in FIG. 3B, he or she rotates the screen module 10 relative to the main body module 20 around a pivotal part of the bottom 11 to open the screen module 10. At the time, along with the rotation of the screen module 10, the driving lever 40 is swung and passes through the cooling slot 21 of the main body module 20 to be against and push the front end of the keyboard module 30. Consequently, along with opening of the screen module 10, the front end of the keyboard module 30 is pushed by the driving lever 40 to lift. Since the back end of the keyboard module 30 is pivotally connected with the main body module 20 via the pivot 31, along with the push of the driving lever 40, the back end of the keyboard module 30 is rotated relative to the main body module 20 around the pivot 31 of the back end to make the front end of the keyboard module 30 lifted.

Afterwards, the screen module 10 is opened. Finally, the screen module 10 is opened to an opening limit position, and then the driving lever 40 is swung to an edge of the keyboard module 30 as shown in FIG. 3C to present an operation state. At the time, since the keyboard module 30 is driven to be lifted by the screen module 10, a gap G can be formed between the keyboard module 30 and the main body module 20. Since the keyboard module 30 does not abut against the main body module 20, the heat dissipation performance of the main body module 20 can be improved. In this embodiment, if an opening angle of the screen module 10 is too large, the driving lever 40 may be detached from the edge of the keyboard module 30, and the keyboard module 30 may drop at the main body module 20 to make the keyboard module 30 or the main body module 20 damaged. Therefore, a block may be disposed at the edge of a bottom of the keyboard module 30 to block the driving lever 40, or the block may be disposed at the bottom 11 of the screen module 10 to limit the opening angle of the screen module 10 to avoid the situation.

On the other hand, as shown in FIG. 1, cooling holes 23 are formed correspondingly to the disposing indentation 29 of the main body module 20. The heat generated by the electronic components in the main body module 20 can be radiated out effectively to improve the heat dissipation performance. On the other hand, since the front end of the keyboard module 30 is lifted by an angle, the whole keyboard module 30 presents a bevel in the operation state, and the user may input words and symbols and operate the keyboard module 30 more conveniently. The size of the gap G is determined by the length of the driving lever 40, an angle between the driving lever 40 and the screen module 10, the opening angle of the screen module 10 and so on. The size of the gap G can be controlled according to consideration for an operation angle or the heat dissipation performance.

Figure 4:
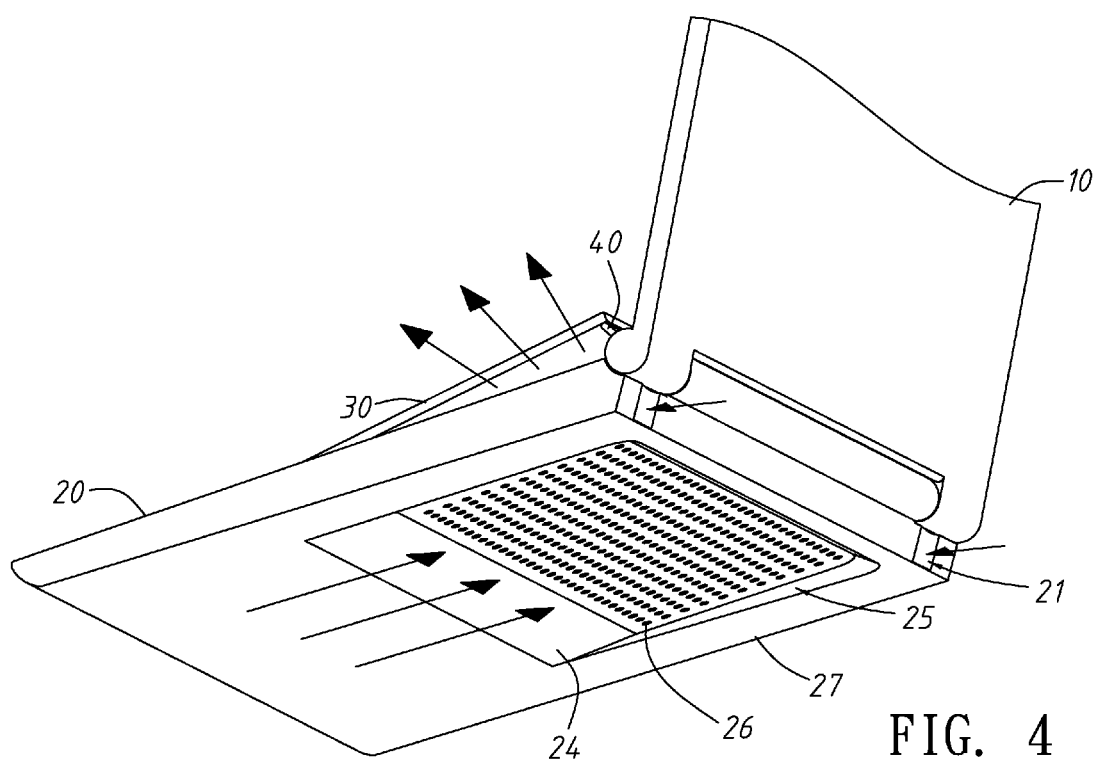
FIGS. 4 and 5 are schematic diagrams showing a back of a main body module of a portable electronic device according to the first embodiment of the invention.
Figure 5:
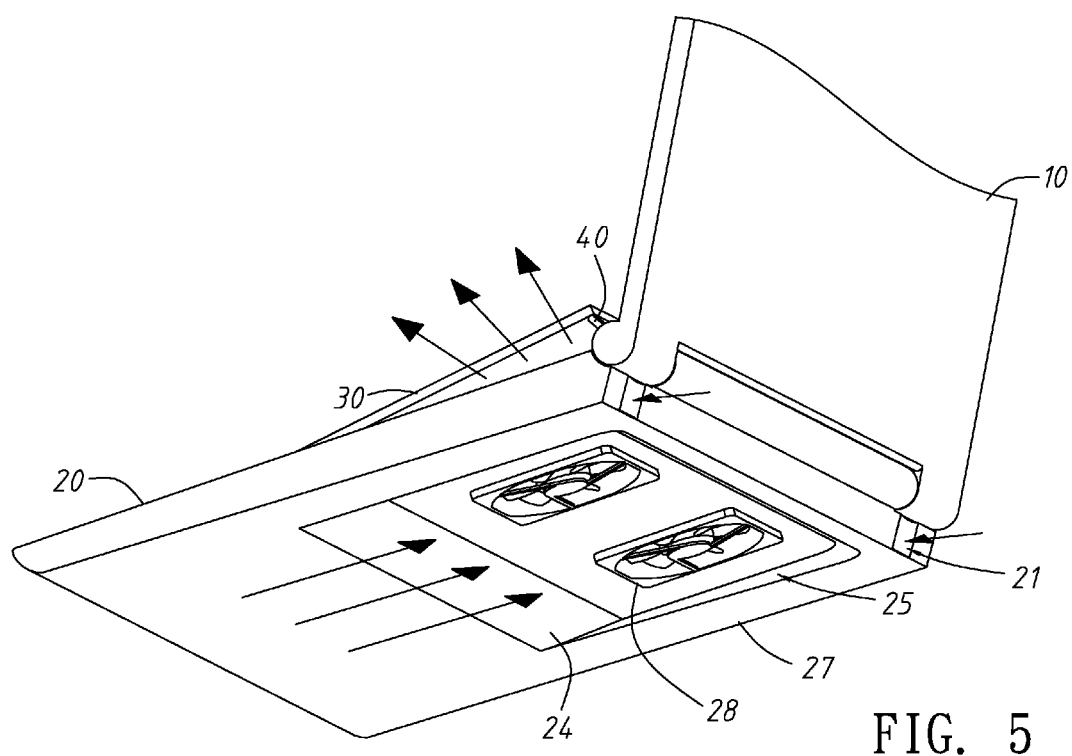

FIG. 4 and FIG. 5 are schematic diagrams showing a back of a portable electronic device according to the first embodiment of the invention.

When the portable electronic device is used, a back 27 of the main body module 20 is disposed on the flat surface such as the desktop to be operated. Most desktops are made of a material such as wood or plastic whose thermal conductivity is low. Thus, the heat dissipation performance at the back 27 is very poor. As a result, a recess 25 is formed at the back 27. As shown in FIG. 4, the recess 25 is approximate at the back 27 of the main body module 20 corresponding to the disposing indentation 29. A plurality of cooling holes 26 are formed on the recess 25. Consequently, the cooling holes 26 with the cooling holes 23 (as shown in FIG. 1) at the disposing indentation 29 can form an air circulation path. The air may enter the cooling holes 26 at the back 27 of the main body module 20, pass through the interior of the main body module 20, and then be released from the above cooling holes 23 to take away the heat effectively.

On the other hand, considering that the back 27 is put on the desktop, the inclined surface 24 connected with the recess 25 is designed at the back 27 of the main body module 20 to allow the air to easily enter into the recess 25. The inclined surface 24 may be designed at any position of the back 27 or changed to an air channel as long as the air easily enters the recess 25.

After the air is released from the cooling holes 23, it escapes via left and right sides of the space under the keyboard module 30. On the other hand, the cooling slot 21 of the main body module 20 may not only passed through by the driving lever 40, but also may be utilized as the heat dissipation passage of the airflow. When the portable electronic device is in the keeping state, that is, the portable electronic device is not in use, the driving lever 40 shields the back of the cooling slot 21 (as shown in FIG. 3A) to prevent dust and foreign bodies etc. entering the main body module 20 via the cooling slot 21. When the portable electronic device is in the operation state (as shown in FIG. 3C), the driving lever 40 is swung to be away from the back of the cooling slot 21 to make the cooling slot 21 exposed and utilized as the heat dissipation passage of the airflow to improve the heat dissipation performance as shown in FIG. 4 and FIG. 5.

As shown in FIG. 5, to further improve the heat dissipation performance, at least a cooling fan 28 may be disposed at the recess 25 to forcibly push the airflow and further improve the heat dissipation performance. Similarly, the cooling fan 28 is not limited to be disposed in the recess 25, and it also may be disposed in the main body module 20 or other positions. The guide direction of the airflow also may be changed.

Figure 6:
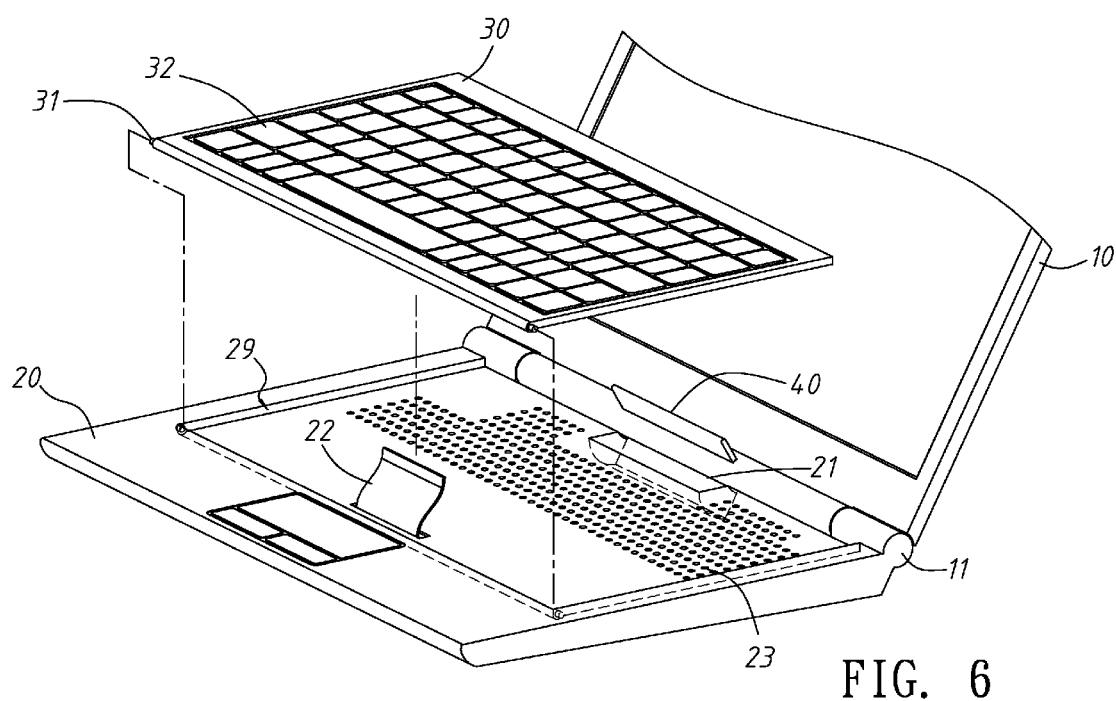
FIG. 6 is a schematic diagram showing another variety of the driving lever of a portable electronic device according to the first embodiment of the invention.

On the other hand, as shown in FIG. 2, the number of the driving lever 40 is two, and the driving lever 40 are at two sides of the bottom 11 of the screen module 10. FIG. 6 is a schematic diagram showing another variety of the driving lever of a portable electronic device according to the first embodiment of the invention. The driving lever 40 can be designed to be larger and at the middle of the bottom 11 of the screen module 10. Since the driving lever 40 is designed to be larger, the cooling slot 21 is larger, and then the heat dissipation performance can be improved.

Figure 7:
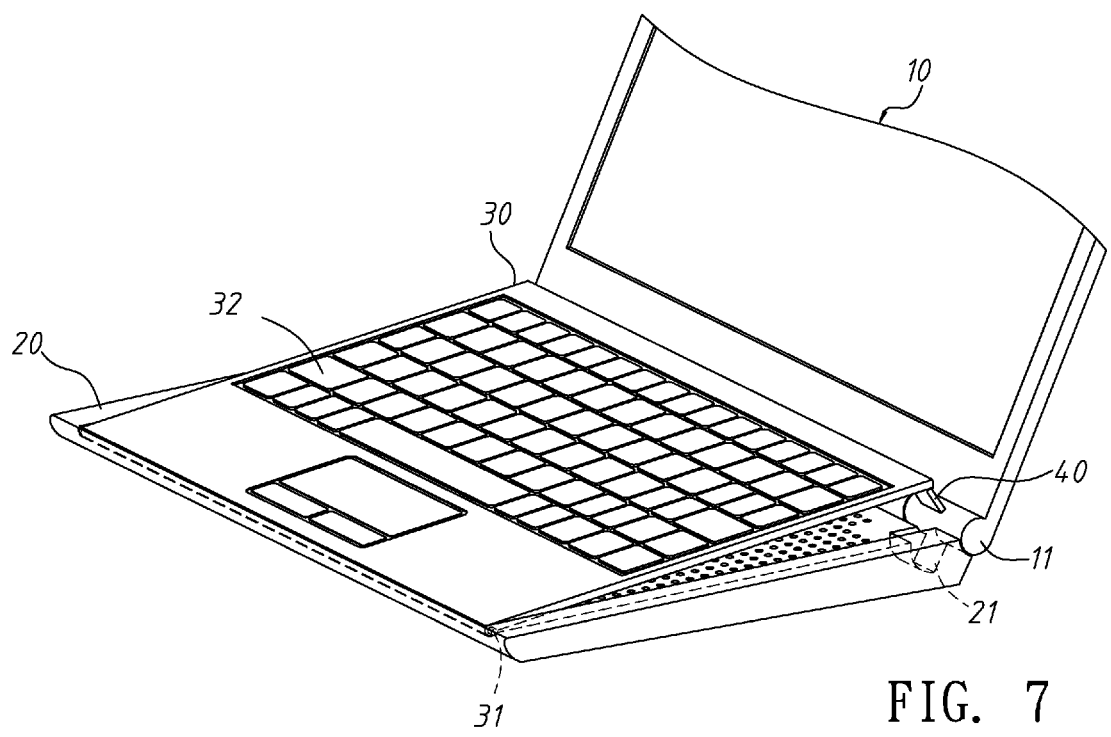
FIG. 7 is a schematic diagram showing another variety of the lifted input/output module of the portable electronic device according to the first embodiment of the invention.

FIG. 7 is a schematic diagram showing another variety of the lifted input/output module of the portable electronic device according to the first embodiment of the invention. Not only the keys 32 of the keyboard module 30 is lifted, but also the pointer input portion 33 of the keyboard module 30 can be lifted. In other words, the size of a lifted portion of the keyboard module 30 is the same as the size of the main body module 20. When the keyboard module 30 is lifted, almost the whole upper part of the main body module 20 is exposed, and thus the heat dissipation performance can be further improved more effectively.

Figure 8A:
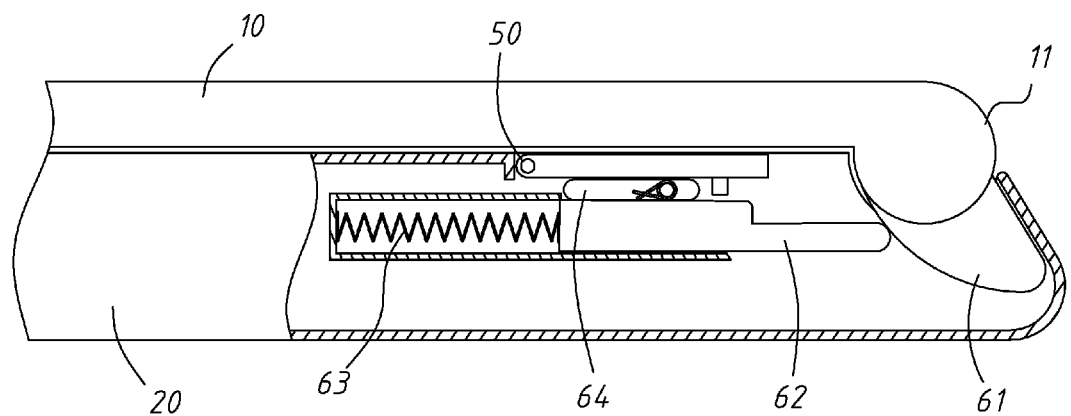
FIGS. 8A to 8C are schematic diagrams showing a portable electronic device according to a second embodiment of the invention.
Figure 8B:
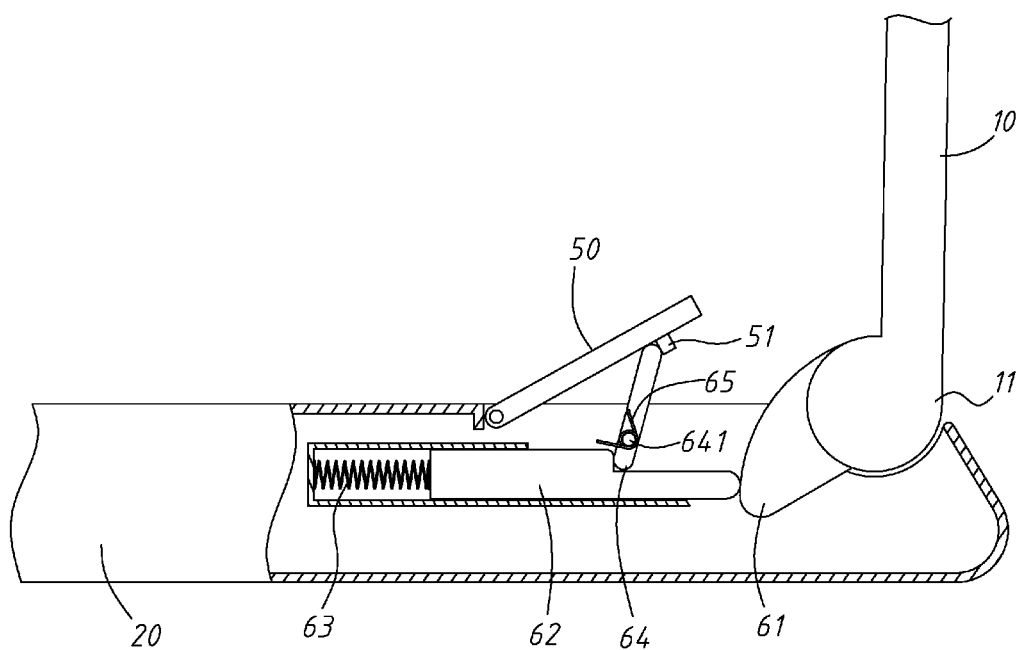
Figure 8C:
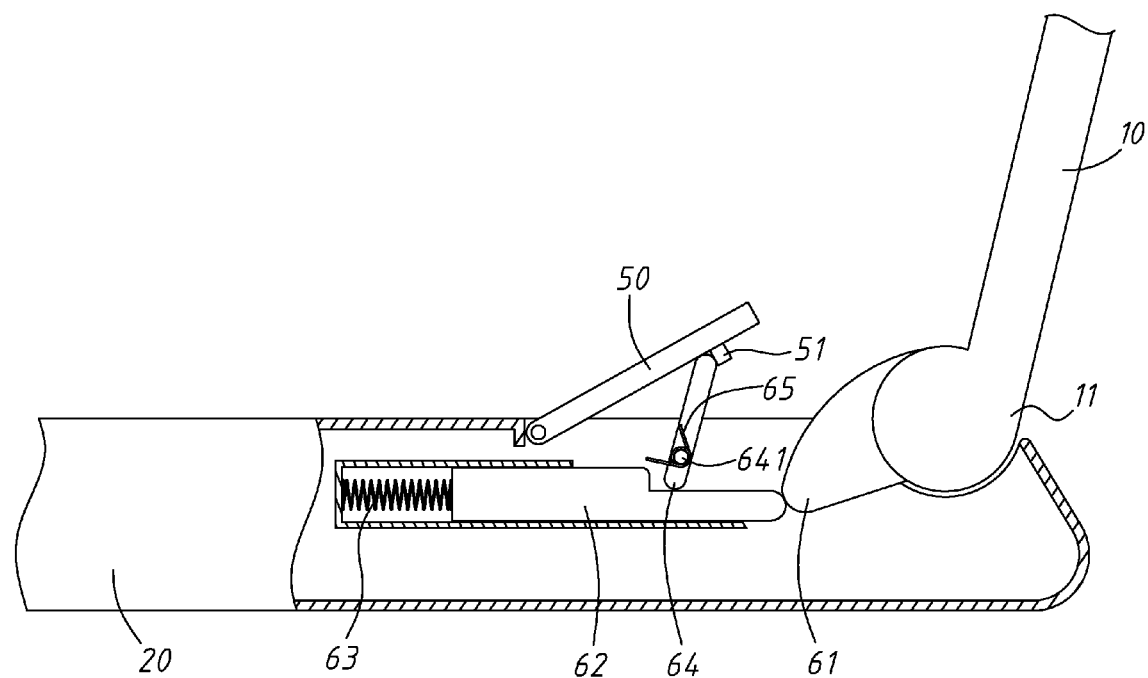

FIGS. 8A to 8C are schematic diagrams showing a portable electronic device according to a second embodiment of the invention. In this embodiment, the lifted input/output module is the speaker.

According to the second embodiment, the actuating element includes a cam 61, a sliding shaft 62 and a pushing rod 64. The cam 61 is disposed at the bottom 11 of the screen module 10 and is against to one end of the sliding shaft 62. The speaker 50 is disposed on the main body module 20. In the un-using condition, the pushing rod 64 abuts against between the sliding shaft 62 and the speaker 50, see FIG. 8A.

When the user wants to use the portable electronic device, as shown in FIG. 8B, he or she rotates the screen module 10 relative to the main body module 20 around a pivotal part of the bottom 11 to open the screen module 10. At the time, along with the rotation of the screen module 10, the cam 61 is rotated and pushes the sliding shaft 62 to slide toward to the main body module 20 to compress the spring element 63, which located on one end of the sliding shaft 62. Consequently, along with opening of the screen module 10, the cam 61 is pushing the sliding shaft 62. The sliding shaft 62 has a step-like surface which with at least two different thicknesses. When the sliding shaft 62 is pushed to make the end of the pushing rod 64 above the right side with thinner thickness, the pushing rod 64 is rotated via the pivot 641 caused by the torsion spring 65, which installed on the pivot 641. Then, the speaker 50 is lifted due to the pushing rod 64 rotated to lift, see FIG. 8C.

Meanwhile, the front end of the pushing rod 64 abuts to the blocker 51 located on the back of the speaker 50 to restrict the lifted angle, and prevent the pushing rod 64 to rotate over the range and unable to return. However, such blocker 51 is illustrated for example in FIG. 8C. The blocker 51 can be replaced by pins or disposed on the main body module 20. By modifying the profile of the cam 61, the lifted time, speed or location angle would be controlled. Due to the speaker 50 is lifted by an angle, the surrounding effect of the speaker and the heat dissipation performance can be improved. For the other arrangements for cooling are similar to the first embodiment, such as showing in FIGS. 5 and 6.

When the screen module 10 is rotated relative to the main body module 20 to be closed, the spring element 63 pushes the sliding shaft 62 to move back. The corner of the right side with thinner thickness of the sliding shaft 62 is against the end of the pushing rod 64, and pushed the pushing rod 64 to rotate via the pivot 641. The pushing rod 64 is rotated to compress the torsion spring 65 and return to abut against between the sliding shaft 62 and the speaker 50, see FIG. 8A.

As a result, in the portable electronic device, since along with the opening of the screen module, the front end of the input/output module is lifted to make the input/output module lifted and be out of a state in which the input/output module flatly abuts against the main body module, and then the heat dissipation performance may be increased effectively. On the other hand, the portable electronic device can be designed with the recesses, the cooling holes, or even the cooling fan. The heat dissipation performance can be further improved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic device, comprising:
   a main body module;
   a screen module having a bottom pivotally connected with the main body module;
   an input/output module abutting against the main body module and electrically connected with the main body module, wherein a back end of the input/output module is pivotally connected with the main body module; the main body module has a disposing indentation at which the input/output module is disposed and the disposing indentation of the main body module has a plurality of cooling holes; and
   an actuating element disposed at the bottom of the screen module, wherein when the screen module is rotated relative to the main body module to be opened, the actuating element pushes a front end of the input/output module to make the input/output module rotate around the back end, and then a gap is formed between the front end of the input/output module and the main body module.

2. The portable electronic device according to claim 1, wherein a recess is formed on a back of the main body module.

3. The portable electronic device according to claim 2, wherein a plurality of cooling holes are formed at the recess of the main body module.

4. The portable electronic device according to claim 2, wherein a cooling fan is disposed at the recess of the main body module.

5. The portable electronic device according to claim 2, wherein the back of the main body module is an inclined surface connected with the recess.

6. The portable electronic device according to claim 1, wherein the actuating element is a driving lever.

7. The portable electronic device according to claim 6, wherein the main body module has a cooling slot, which is shielded by the driving lever, and when the driving lever is driven, the cooling slot is exposed.

8. The portable electronic device according to claim 1, wherein the input/output module is selected from the group consisting of a keyboard module, a speaker, a touch panel and combinations thereof.

9. The portable electronic device according to claim 8, wherein the keyboard module comprises a plurality of keys and a pointer input portion.

10. The portable electronic device according to claim 8, wherein a size of the keyboard module is equal to a size of the main body module.

11. The portable electronic device according to claim 1, wherein the actuating element comprises a cam, a sliding shaft and a pushing rod, the sliding shaft is disposed at the bottom of the screen module, wherein when the screen module is rotated relative to the main body module to be opened, the cam pushes the sliding shaft to drive the pushing rod to lift the front end of the input/output module.

12. The portable electronic device according to claim 11, wherein the sliding shaft connects to a spring element, wherein when the screen module is rotated relative to the main body module to be closed, the spring element pushes the sliding shaft back.

13. The portable electronic device according to claim 11, wherein the pushing rod includes a torsion spring, wherein the pushing rod abuts against between the sliding shaft and the input/output module; wherein when the screen module is rotated relative to the main body module to be opened and the sliding shaft is moved away through the cam, the pushing rod is rotated by the torsion spring to lift the front end of the input/output module.

* * * * *